April 28, 1964  P. SCHMUCK  3,130,657
CAMERA, PREFERABLY MOTION PICTURE CAMERA
Filed Feb. 17, 1959
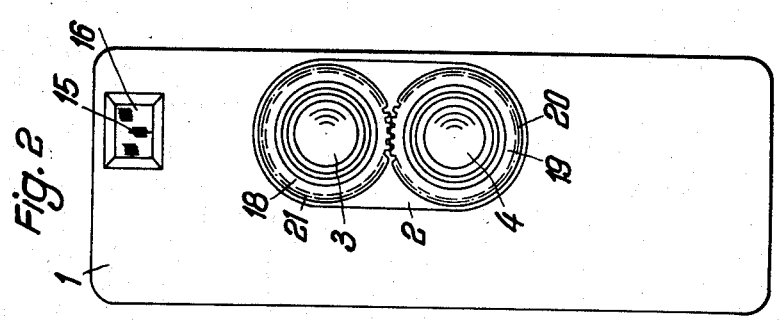
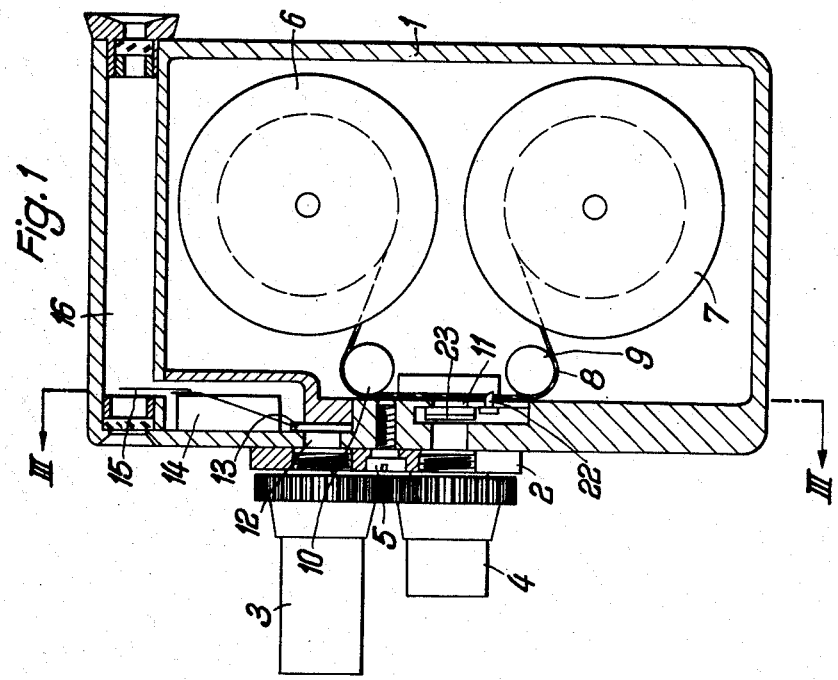
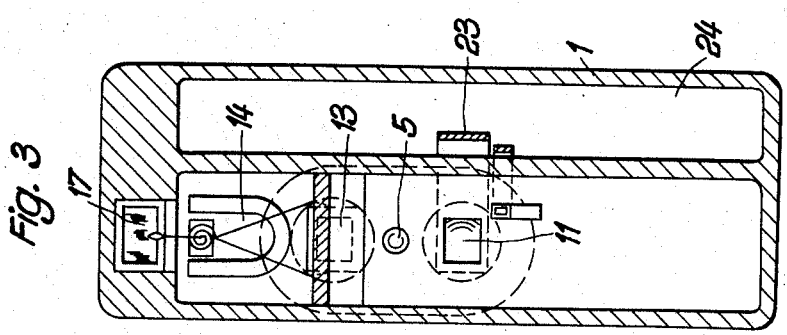
Inventor:
Peter Schmuck United States Patent Office 3,130,657
Patented Apr. 28, 1964

3,130,657
CAMERA, PREFERABLY MOTION
PICTURE CAMERA
Peter Schmuck, Mauren, Liechtenstein, assignor to Contina Bureaux- und Rechenmaschinenfabrik Aktiengesellschaft, Mauren, Liechtenstein
Filed Feb. 17, 1959, Ser. No. 793,855
Claims priority, application Austria Mar. 7, 1958
2 Claims. (Cl. 95—10)

The present invention relates to a camera, preferably a motion picture camera, which comprises at least two lenses arranged like a revolving nosepiece and pivotally movable about a common axis.

Various types of motion picture cameras are known in which lenses having preferably different focal lengths are connected to the camera housing by means of a holder so that the lenses are pivotally movable about a common axis and can be selectively moved into the path of light rays impinging on the light-sensitive layer of the film. It has also been disclosed to arranged the several lenses on the holder in such a manner that they are exchangeable. The advantage of the known devices resides in that photographs can be taken with different focal lengths and different angles of lens, a pivotal movement of the lenses, which can be quickly performed, being sufficient to enable the use of that particular lens which is suitable for a given photograph.

It is an object of the present invention to improve cameras of the type described hereinbefore thereby that a lens which is not required for the exposure can be used for an approximately correct determination of the diaphragm setting where the exposure time is pregiven and that in those cases in which an absolutely correct determination of the diaphragm aperture or, where the diaphragm aperture is given, of the exposure time is necessary, the lens to be used for the exposure itself can be moved to a position before the exposure meter so that the light measurement takes place exactly under the conditions which prevail during the exposure.

This object is solved in that in cameras, particularly motion picture cameras, having at least two lenses arranged like a revolving nosepiece and pivotally movable about a common axis and having preferably different focal lengths and coupled diaphragm adjusting means, a light-responsive cell provided with a measuring and indicating mechanism is disposed according to the invention in the path of rays of a lens not used for the exposure. The indicator of the cell is preferably visible in the viewfinder of the camera.

A camera thus constructed affords the advantage mentioned hereinbefore that the lens not used at a time can be used for a light measurement so that it is possible either to determine approximately the diaphragm aperture required where the exposure time is pregiven or, where the diaphragm aperture is given, to determine approximately the correct exposure time. The angle of the lens not used at the time generally does not agree with that of the lens used for the exposure so that basically different illumination exposure conditions result in extreme cases, e.g. when a skier is to be photographed with a telescopic lens (telephoto lens) as well as in the case of photographing the snow area in which the skier is only a dot with a normal or wide-angle lens. In most cases, however, in which the distribution of light over the picture field does not substantially vary, the lens not used for the exposure may readily be used for ascertaining the prevailing light conditions in such a manner that satisfactory exposures result. In addition, the further advantage results that the light conditions which prevail during the exposure can be ascertained even with absolute accuracy. In this case the lens to be used for the exposure is temporarily moved to the position in which the exposure meter lies in the path of rays of this lens. The same measure may be adopted in the afore-mentioned extreme cases so that the light conditions can be definitely and exactly ascertained and taken into consideration even in such cases. The coupling between the diaphragm adjusting means is useful if the lens not used for the exposure is in a position in which the light-responsive cell is in the path of rays of this lens. In this case the light measurement is effected substantially under the conditions which occur in the lens used for the exposure because the influence of diaphragm aperture differences is much greater than the influence of brightness variations occurring under normal conditions, excepting the said extreme cases, with respect to the distribution of light over the picture field. The indicator visible in the viewfinder of the camera enables to determine whether the diaphragm aperture set at a time is sufficient for obtaining a useful photograph in view of the light which will be incident during the exposure if the exposure time is pregiven. If this is not the case, an appropriate diaphragm adjustment, which is effective on the lens used for the exposure as well as on the lens disposed before the light-responsive cell, can be effected to vary the diaphragm aperture. Certain reliable limits for the indication in the viewfinder may be marked to determine the necessary increase or reduction of the diaphragm aperture and to watch its adjustment by means of the indicator in the viewfinder.

The coupling of the diaphragm adjusting means is suitably effected by a mechanical coupling between the diaphragm adjusting rings of the several lenses. This may be effected, e.g., by means of meshing teeth on the diaphragm adjusting rings or by an adjusting device in which a rotary adjusting knob is connected to a toothed wheel in mesh with corresponding toothed segments of the diaphragm adjusting rings.

To enable a joint adjustment of the diaphragms the lenses are preferably affixed to a holder which is rotatable about the common axis. Such an arrangement has the advantage that the position of the lenses relative to each other is retained even during a rotation of the lenses to interchange the lenses for different photographs. It is also possible, however, to affix the several lenses to separate holders, each of which is pivotally movable about the common pivot so that they are also relatively pivotally movable relative to each other. In such structures, however, greater difficulties and additional structural expenditure are involved in the mechanical coupling of the diaphragm adjusting device.

The drawing shows by way of example an embodiment of a motion picture camera according to the invention.

FIG. 1 is a longitudinal sectional view of the motion picture camera having two lenses arranged like a revolving nosepiece.

FIG. 2 is a front view of the motion picture camera of FIG. 1 and

FIG. 3 shows the motion picture camera in an elevation taken on line III—III of FIG. 1.

In the figures, 1 is the housing of the camera, which has attached thereto the lens carrier 2 for the lenses 3 and 4, which have different focal lengths. The lens carrier 2 is affixed to the housing 1 of the camera by means of the screw 5. Film spools 6 and 7 are disposed in known manner in the housing so that the film 8 is moved by means of guide rollers 9 and 10 past the picture aperture 11 in the path of rays of one of the lenses. Another housing opening 12 arranged in the path of rays of the lens not used for the exposure is closed toward the interior of the camera housing by a light-responsive cell 13. The light-responsive cell 13 is connected to a measuring mechanism 14, which has an indicator 15, which extends into the range of the viewfinder 16 and is visible when a view is taken through the viewfinder. The viewfinder 16 contains marks 17, which together with the indicator 15 indicates the correct setting of the diaphragm aperture when the indicator 15 is in a predetermined position relative to these marks. As is apparent from FIG. 2 the diaphragm adjusting rings 18 and 19 of the lenses 3 and 4 are provided with teeth 20 and 21, which intermesh in such a manner that the adjustment of one of the rings 18 and 19 will move the diaphragm adjusting ring to the other lens in unison.

FIGS. 1 and 3 show also the film feed mechanism 22 and the shutter blade 23. The transmission for feeding the film and moving the shutter is not shown and accommodated in the space behind the spools.

The mode of operation of the device is readily apparent from the drawing. When one of the lenses 3 or 4 is disposed in the path of rays leading to the picture aperture the other lens is disposed in the path of rays leading to the light-responsive cell, preferably a selenium cell. Upon a view through the viewfinder 16 the indicator 15 appears between the marks 17 if the diaphragms of the lenses are set to the correct aperture. If the indicator 15 does not appear between the marks 17 upon a view through the viewfinder, the operator must operate the diaphragm adjusting rings to vary the diaphragm apertures until the indicator 15 is in agreement with the marks 17. For instance, if an exchange of lenses is desired in the case of a change of the objects to be shot, the lenses are pivotally moved together with the rotatable lens carrier about their central axis, which agrees with the centre line of the fixing screw 5. The lens carrier may be constructed to cover the picture aperture during the pivotal movement so that there will be no exposure of parts of the film 8 during the pivotal movement of the lenses.

If an exact determination of the diaphragm aperture or exposure time is required, the lens to be used for the exposure is moved in front of the light-responsive cell 13.

Instead of the lenses 3 and 4 shown in the illustrative embodiment, more than two lenses may be arranged on an appropriately constructed lens carrier. In this case it is sufficient to provide an arrangement in which one of the lenses not used for the exposure lies at any time in the path of rays leading to the light-responsive cell 13. It is within the scope of the invention to construct the pivotally arranged lenses themselves as exchangeable lenses, whereby the versatility of the camera is further increased.

It is in the nature of the invention that it is not restricted to an arrangement of lenses in a revolving nosepiece. The invention may also be applied without difficulty to lenses in a different arrangement and capable of a different adjustment, e.g., to slidable lenses.

It is also in the nature of the present invention that the diaphragm adjustment of the two lenses may have mutually independent diaphragm adjustments. This means that the free lens or the lens disposed in front of the selenium cell is first used for the measurement and the value thus ascertained is transferred by manual operation to the lens lying for the exposure in front of the light-sensitive layer.

The invention can be carried out with numerous modifications of the embodiment shown in the drawing. For instance, it is readily possible to affix each lens to a carrier associated therewith and to provide a construction in which the optical axis of each lens can be caused independently of those of the other lenses to register with a path of rays directed to the light-responsive cell or the material to be exposed.

What is claimed is:

1. In a camera, in combination, a pair of objectives; support means supporting said objectives for movement between a first position where one objective is in a picture-taking position and the other objective is in a light-measuring position and a second position where said one objective is in a light-measuring position and said other objective is in a picture-taking position and means cooperating with that objective which at a given instant is in said light-measuring position for measuring the intensity of light which has passed through the latter objective, said objectives respectively including a pair of diaphragms and a pair of adjusting means respectively cooperating with said diaphragms for adjusting the latter, and said pair of adjusting means cooperating with each other for producing adjustment of both diaphragms when one of the adjusting means is actuated, the light-measuring means aligning a pointer with an index when the diaphragm of the objective in the light-measuring position has been properly set according to the lighting conditions, so that the setting of the diaphragm of the objective in the light-measuring position results automatically in at least approximately proper setting of the diaphragm of the objective in the picture-taking position and in precise setting of the diaphragm of the objective in said light-measuring position.

2. In a camera, in combination, a front wall formed with a film-exposing aperture and with a light-measuring aperture; a pair of objectives respectively including a pair of diaphragms and a pair of coupled diaphragm adjusting means for setting said diaphragms and for automatically setting one diaphragm when the other diaphragm is set; support means supporting said objectives for movement between a first position where one objective is aligned with said film-exposing aperture and the other objective is aligned with said light-measuring aperture and a second position where said one objective is aligned with said light-measuring aperture and the other objective is aligned with said film-exposing aperture; a viewfinder having a window carrying an index; an instrument having a pointer movable with respect to said index and adapted to be aligned therewith so that the alignment of the pointer with the index can be observed while viewing the subject through the viewfinder; and means aligned with said light-measuring aperture and cooperating with said instrument for influencing the latter according to the light which passes through said light-measuring aperture, the adjusting means of either of said objectives being operable to adjust the diaphragm of that objective which at a given instant is aligned with said light-measuring aperture until the pointer is aligned with said index.

References Cited in the file of this patent

UNITED STATES PATENTS

| | | |
|---|---|---|
| 1,906,059 | Hadaway | Apr. 25, 1933 |
| 2,229,289 | Goldhammer | Jan. 21, 1941 |
| 2,250,898 | Tonnies | July 29, 1941 |
| 2,278,338 | Tonnies | Mar. 31, 1942 |
| 2,297,428 | Nuchterlein | Sept. 29, 1942 |
| 2,302,597 | Bing | Nov. 17, 1942 |
| 2,655,848 | Gray | Oct. 20, 1953 |
| 2,865,274 | Richartz | Dec. 23, 1958 |